United States Patent

[11] 3,593,028

| [72] | Inventor | Antti Lehtinen |
| | | Jyvaskyla, Finland |
| [21] | Appl. No. | 705,682 |
| [22] | Filed | Feb. 15, 1968 |
| [45] | Patented | July 13, 1971 |
| [73] | Assignee | Valmet Oy Punanotkonkatu |
| | | Helsinki, Finland |
| [32] | Priority | May 10, 1967 |
| [33] | | Finland |
| [31] | | 1344/67 |

[54] METHOD FOR PHOTOELECTRICALLY MEASURING WIRE MARKINGS IN PAPER INCLUDING TAKING RATIO OF A.C. TO D.C. COMPONENTS
1 Claim, 1 Drawing Fig.

[52] U.S. Cl.................................................. 250/219,
356/201, 356/239
[51] Int. Cl................................................ G01n 21/30
[50] Field of Search........................................ 250/219,
219 W, 233; 356/201, 202, 199, 200, 238, 239

[56] References Cited
UNITED STATES PATENTS
| 2,844,068 | 7/1958 | Williams...................... | 250/219 |
| 3,124,637 | 3/1964 | Heitzer......................... | 256/233 |
| 3,388,261 | 6/1968 | Roberts et al................ | 250/219 |
| 3,437,823 | 8/1969 | Joyce........................... | 250/219 |

Primary Examiner—James W. Lawrence
Assistant Examiner—Martin Abrams
Attorney—Richards and Geier ABSTRACT: A beam of light is used to measure the extent of wire markings upon a sheet of paper which was dried upon a wire mesh in a paper making machine. The beam of light is passed through a sheet of paper and then strikes a photomultiplier tube which produces an electrical current having AC and DC components. A milliammeter measures the DC component. the AC component before being measured is passed through a filter which removes from it all frequencies except the frequency consistent with the wire marking. The filter may be connected with a switch and the switch may be a selector switch to vary the frequency bands passed by the filter. An instrument which measures the ratio of the filtered AC component to the DC component can indicate as percentage the extent of the wire.

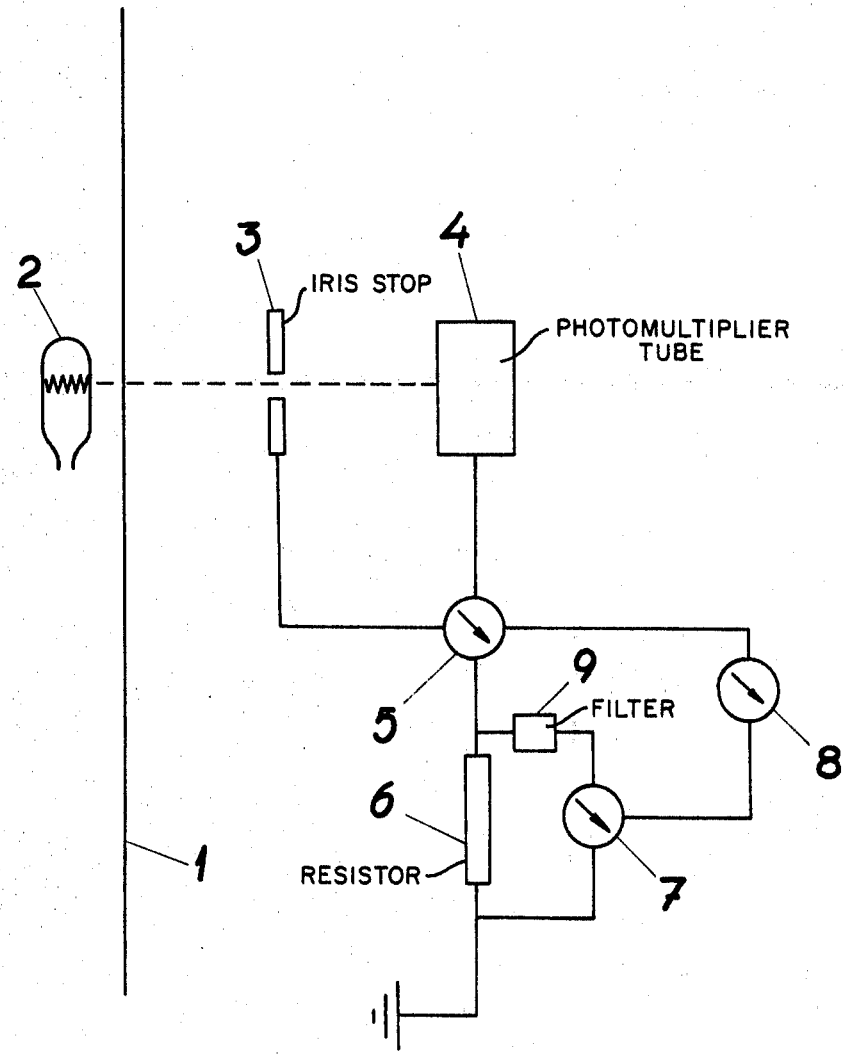

METHOD FOR PHOTOELECTRICALLY MEASURING WIRE MARKINGS IN PAPER INCLUDING TAKING RATIO OF A.C. TO D.C. COMPONENTS

The present invention concerns measurement of the strength of wire marking in paper. In particular, it has reference to the use of a formation measuring method independent of the opacity of the paper, in which the variations in light transmittance of the paper are utilized in that a light beam is passed through the moving paper web and after traversing the paper is allowed to act on a light-sensitive element, and as a measure for the non uniformity of paper formation, and in the present case thus for the strength of wire marking, there is used the ratio of the AC component and the DC component.

At the manufacturing of paper there is produced in the wire section of the paper machine, where the fiber web is dried on a wire mesh, on the lower surface of the paper a more or less pronounced configuration impressed by the wire, or wire mark, which is one of the factors combining to form the cloudiness or formation of paper. Wire marking is a detrimental effect because it causes the printability characteristics of the paper to be different on different sides. Strong wire marking even otherwise impedes achievement of good printing results.

In the assessment of the strength of wire marking one has been compelled up to now to rely, in practice, on ocular scrutiny of the finished paper. The result achieved in this manner is, however, rather indefinite and considerably dependent on the assessor. It would be important from the viewpoint of paper manufacturing to be able to measure the strength of wire marking in some more accurate and more reliable way, because this would enable appropriate adjustments to be made to govern the paper machine in a manner such as to minimize the wire mark. It would be most desirable of all to perform this measurement as a continuous online measurement in the paper machine.

The present invention accordingly has for its aim to afford, using a paper formation measuring method, the possibility of continuously measuring the strength of wire marking in paper in the paper machine itself. A paper formation method according to the invention is mainly characterized in that from the AC component of the electric current produced by a light-sensitive element, achieved according to the procedure for measurement of the strength of wire marking in paper presented heretofore in the introduction, all frequencies are eliminated by filtering other than the frequency consistent with the wire mark.

A method according to the invention enables the strength of wire marking to be continuously followed on the paper machine and such adjustments to be found for the machine which produce a minimum of wire marking while adequate quality of the paper's other characteristics is retained. Moreover, the method enables the strength of wire marking to be expressed numerically, thus eliminating the indeterminacy that has prevailed up to date in the judgement of wire marking.

The invention is described in closer detail in the following in the light of an embodiment example and with reference to the attached drawing.

In the drawing, the lamp 2 emits through the moving paper web 1 a light beam, which after passing the iris stop 3 strikes the photomultiplier tube 4. The current produced in the multiplier tube is passed to ground through a known resistor 6, the direct current component ($\bar{U}$) is measured with the milliammeter 5, which controls the iris stop 3 in a manner such that this direct current component remains constant. The AC component ($U_m$) is measured by the voltage drop it causes across the known resistor 6, with the AC instrument 7 for measuring instrument. From the instrument 8 the ratio $U_m/\bar{U}$ of the AC component and DC component, which is no longer dependent on the intensity of the light source or other secondary factors, can be read as a percentage. Moreover, this quantity accounts for the opacity of the paper so that the non uniformity of paper formation can be measured independent of the opacity. This ratio is a characteristic constant for each type of paper because in the case of a given paper $U_m$ and $\bar{U}$ are directly proportional at least within a certain range.

In the above-described manner any nonuniformities of the paper formation may be measured, but when it is desired to measure exclusively the strength of wire marking, a filter 9 has to be used before the AC measuring instrument 7, which filters out of the AC component all frequencies except the particular frequencies consistent with the wire mark, and which frequencies may be calculated in advance when the type of wire and the speed of the paper web are known. It is advantageous to design the filters 9 so that the frequency bands passed by it may be changed within certain limits, e.g. by means of a selector switch. By this arrangement with each type of wire and machine speed the wire mark frequencies consistent with them can be made to pass through the filter.

The measuring instrument may, in one alternative, be built so that the filter 9 can be placed in operation or disconnected by operating a switch, in which case the measurement will concern, depending on the position of the switch, either the strength of wire marking or the paper formation on the whole. Another alternative is to design the instrument so that with its aid the paper formation in general and the strength of wire marking may both be simultaneously measured.

The invention is not restricted to the embodiment described in the foregoing, and it may be modified in numerous ways without leaving the coverage of the invention.

I claim:

1. The method of measuring the extent of wire markings on paper, which comprises, in combination, the steps of passing a beam of light through a moving web of paper, limiting the transmitted light beam by iris stop and then causing it to produce an electrical current, separating the electrical current into AC and DC components, controlling the iris stop to maintain the DC component constant, removing from the AC component all frequencies which are not consistent with the frequency of wire markings by switch operated frequency filter, varying the frequency of the remaining AC component and measuring the ratio of the remaining AC component to the DC component.